(12) United States Patent
Xiaofan (10) Patent No.: US 6,597,837 B2
(45) Date of Patent: Jul. 22, 2003

(54) OPTICAL CIRCUIT MODULE AND METHOD FOR ASSEMBLING THE SAME

(75) Inventor: Zhu Xiaofan, Cupertino, CA (US)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 09/998,596

(22) Filed: Nov. 16, 2001

(65) Prior Publication Data

US 2002/0085807 A1 Jul. 4, 2002

(30) Foreign Application Priority Data

Nov. 21, 2000 (JP) ........................................ 2000-354816

(51) Int. Cl.[7] .............................. G02B 6/32; G02B 6/42
(52) U.S. Cl. ............................. 385/33; 385/31; 385/34
(58) Field of Search ............................... 385/31, 33, 34

(56) References Cited

U.S. PATENT DOCUMENTS

| | | | | |
|---|---|---|---|---|
| 4,932,742 A | * | 6/1990 | Tohme | 359/124 |
| 4,988,159 A | * | 1/1991 | Turner et al. | 385/33 |
| 5,555,330 A | | 9/1996 | Pan et al. | 385/39 |
| 5,822,478 A | * | 10/1998 | Kim | 385/31 |
| 6,040,944 A | * | 3/2000 | Pan et al. | 359/210 |
| 6,212,305 B1 | * | 4/2001 | Pan | 385/11 |
| 6,324,326 B1 | * | 11/2001 | Dejneka et al. | 359/341.1 |
| 6,353,692 B1 | * | 3/2002 | Colbourne | 385/16 |

FOREIGN PATENT DOCUMENTS

JP 09-230169 9/1997 ............ G02B/6/32

* cited by examiner

Primary Examiner—John D. Lee
Assistant Examiner—Daniel Valencia
(74) Attorney, Agent, or Firm—Marsh Fischmann & Breyfogle LLP

(57) ABSTRACT

A miniaturized and easy-assembling optical circuit module includes optical signal emitting means for emitting an optical signal, a sleeve having an end surface, an optical device having a reflection surface, which contacts the end surface, and a lens located between the optical signal emitting means and the optical device. The lens converts the optical signal to a collimated optical signal, which is emitted to the optical device, reflected by the reflection surface and then converged by the lens to generate a converged light signal. The module further includes optical signal receiving means for receiving the converged light signal. The lens is fixed in the sleeve such that the focal point of the lens is aligned with the reflection surface. The optical signal emitting means and the optical signal receiving means are fixed in the sleeve such that the converged light signal is coupled into the optical signal receiving means.

15 Claims, 5 Drawing Sheets

OPTICAL CIRCUIT MODULE AND METHOD FOR ASSEMBLING THE SAME

BACKGROUND OF THE INVENTION

The present invention relates to an optical circuit module. Particularly, the present invention pertains to an optical circuit module that has a collimator and is used for optical communication and to a method for assembling the same.

Japanese Unexamined Patent Publication No. 09-230169 discloses a first prior art optical circuit module that has a collimator. The first prior art optical circuit module includes two optical fibers and a capillary, which retains strands of the optical fibers. The optical fibers and the capillary are fixed to a ferrule. The ferrule is welded to a sleeve, which is welded to a first lens holder. A lens and an optical filter are fixed to the first lens holder. The lens holder is welded to a projecting block, which is welded to a housing.

In the first prior art optical circuit module, an excitation light, which is emitted from one of the two optical fibers, is converted to a parallel light with the lens. The parallel light is then emitted to the optical filter. The excitation light, which is reflected back by the optical filter, enters the other one of the optical fibers. In the first prior art optical circuit module, the sleeve and the first lens holder are adjusted while the first lens holder and the projecting block are also adjusted to couple the excitation light into the other one of optical fibers.

However, since the first prior art optical circuit module includes many parts, the size of the entire module and the cost tend to increase. Also, since many parts need to be fixed by adhesive or welding, the assembling procedure is complicated. Furthermore, since the optical filter, which is an optical device, is not located at the focal point of the lens, the coupling loss is great.

U.S. Pat. No. 5,555,330 discloses a second prior art optical circuit module that has a collimator. The second prior art optical circuit module includes a glass capillary, a lens, and a filter. The glass capillary retains two optical fibers. One end surface of the lens is secured to the end surface of the glass capillary. The end surface of the lens and the end surface of the glass capillary are attached by thermosetting resin. The filter is secured to the other end surface of the lens.

Since the end surface of the glass capillary, which retains two optical fibers, is fixed to one end surface of the lens with adhesive made of thermosetting resin, the adhesive could enter the optical path between the glass capillary and the lens. Therefore, an operator must be careful that the adhesive does not enter the optical path while fixing the capillary to the lens. This complicates the procedure for fixing the components with adhesive. Furthermore, the adhesive reliability is low.

SUMMARY OF THE INVENTION

The objective of the present invention is to provide a compact optical circuit module that is easy to assemble, and a method for assembling the same.

To achieve the foregoing objective, the present invention provides an optical circuit module including optical signal emitting means, a first sleeve, an optical device, a first lens, and optical signal receiving means. The optical signal emitting means emits an optical signal. The first sleeve includes a first end surface. The optical device includes a reflection surface. The reflection surface abuts against the first end surface of the sleeve. The first lens is located between the optical signal emitting means and the optical device. The first lens converts the optical signal emitted from the optical signal emitting means into a collimated optical signal and emits the collimated optical signal to the optical device. The optical device reflects the collimated optical signal with the reflection surface. The first lens converges the reflected collimated optical signal and generates a converged light signal. The optical signal receiving means receives the converged light signal. The first lens is fixed in the first sleeve such that the focal point of the lens aligns with the reflection surface of the optical device. The optical signal emitting means and the optical signal receiving means are fixed in the first sleeve such that the converged light signal is coupled into the optical signal receiving means.

The present invention also provides a method for assembling an optical circuit module. The optical circuit module includes optical signal emitting means, a sleeve, an optical device, a lens, and optical signal receiving means. The optical signal emitting means emits an optical signal, The sleeve has a first end surface. The optical device has a reflection surface. The reflection surface abuts against the first end surface of the sleeve. The lens is located between the optical signal emitting means and the optical device. The lens converts an optical signal, which is emitted from the optical signal emitting means, into a collimated optical signal, and emits the collimated optical signal to the optical device. The optical device reflects the collimated optical signal with the reflection surface. The lens converges the reflected collimated optical signal and generates a converged light signal. The optical signal receiving means receives the converged light signal. The assembling method includes fixing the lens in the sleeve such that the focal point of the lens aligns with the first end surface of the sleeve, adjusting the inclination angle of the optical device with respect to the central axis of the lens such that the intensity of the converged light signal received by the optical signal receiving means is maximized, adjusting the position of the optical signal emitting means and the optical signal receiving means along the central axis of the lens, and fixing the optical device to the first end surface of the sleeve and fixing the optical signal emitting means and the optical signal receiving means in the sleeve.

A further aspect of the present invention is a method for assembling an optical circuit module. The optical circuit module includes optical signal emitting means, a sleeve, an optical device, a lens, and optical signal receiving means. The optical signal emitting means emits an optical signal. The sleeve has a first end surface. The optical device has a reflection surface. The reflection surface abuts against the first end surface of the sleeve. The lens is located between the optical signal emitting means and the optical device. The lens converts an optical signal, which is emitted from the optical signal emitting means, into a collimated optical signal, and emits the collimated optical signal to the optical device. The optical device reflects the collimated optical signal with the reflection surface. The lens converges the reflected collimated optical signal and generates a converged light signal. The optical signal receiving means receives the converged light signal. The assembling method includes fixing the optical device to the sleeve such that the reflection surface abuts against the first end surface of the sleeve, fixing the lens in the sleeve such that the focal point of the lens aligns with the first end surface of the sleeve, adjusting the position of the optical signal emitting means and the optical signal receiving means along the central axis of the lens and the inclination angle of the optical signal emitting means and the optical signal receiving means with respect to the central axis of the lens such that the intensity of the converged light signal received by the optical signal receiving means is maximized, and fixing the optical signal emitting means and the optical signal receiving means to the sleeve.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

In the drawings, like numerals are used for like elements throughout.

[First Embodiment]

Figure 1:
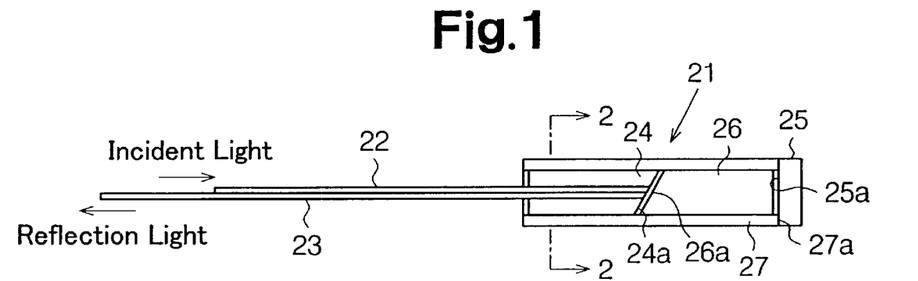
FIG. 1 is a schematic cross-sectional view of an optical circuit module according to a first embodiment of the present invention.

An optical circuit module 21 according to a first embodiment of the present invention will now be described with reference to FIGS. 1, 2, and 3A. As shown in FIG. 1, the optical circuit module 21 includes an input optical fiber (optical signal emitting means) 22, an output optical fiber (optical signal receiving means) 23, a capillary (first capillary) 24, an optical device (first optical device) 25, and a lens (first lens) 26.

The capillary 24 retains the input optical fiber 22 and the output optical fiber 23. The lens 26 is arranged between the capillary 24 and the optical device 25. The lens 26 receives an optical signal from the input optical fiber 22 and converts the optical signal into a collimated optical signal, The collimated optical signal then enters the optical device 25. In the first embodiment, the lens 26 is a gradient-index rodlens. However, the lens 26 does not have to be a rod lens.

An entrance end of the input optical fiber 22 receives the optical signal (incident light) sent from an other optical element (not shown). The input optical fiber 22 transmits and emits the incident light to the lens 26 from an emission end.

The output optical fiber 23 receives a converged light signal, which is reflected by a reflection surface 25a of the optical device 25 and converged by the lens 26. The converged light signal (reflection light), which enters an entrance end of the output optical fiber 23, is transmitted through the output optical fiber 23 and emitted from the emission end of the output optical fiber 23 to the other optical element. The output optical fiber 23 functions as an optical signal detecting means.

Various kinds of filters, partial reflecting mirrors, or total reflecting mirrors may be used as the optical device 25. In the first embodiment, the optical device 25 is an optical filter. The optical device 25 is fixed to a first end surface 27a of a sleeve (first sleeve) 27. The sleeve 27 may be, for example, cylindrical.

The lens 26 is fixed to a predetermined position on the sleeve 27 such that the focal point is aligned with the reflection surface 25a of the optical device 25. In the first embodiment, the distance d1 (see FIG. 3A) between a second end surface 26b of the lens 26 and the focal point of the lens is, for example, approximately 0.25 mm. In the first embodiment, the reflection surface 25a of the optical device 25 is the front surface of the material 25. However, the back surface of the optical device 25 may be used as the reflection surface 25a.

The capillary 24 is secured inside the sleeve 27 such that the converged light signal is coupled into the output optical fiber 23.

Figure 2:
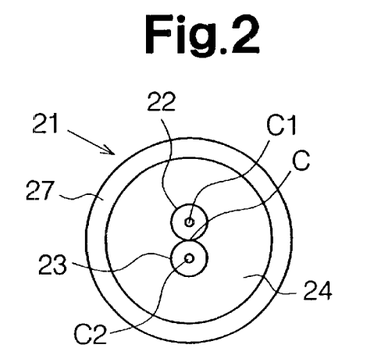
FIG. 2 is a cross-sectional view taken along line 2—2 of FIG. 1.

In the first embodiment, the input optical fiber 22 and the output optical fiber 23 are retained by the capillary 24 such that the center C1 of the core of the input optical fiber 22 and the center C2 of the core of the output optical fiber 23 are symmetrical with respect to the center C of the capillary 24 and parallel with each other as shown in FIG. 2.

Figure 3A:
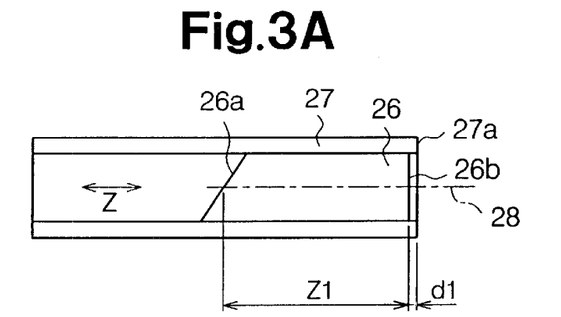
FIG. 3A and FIG. 3B are explanatory diagrams of assembling procedure for the optical circuit module of FIG. 1.

As shown in FIG. 3A, a first end surface 26a of the lens 26, which faces the capillary 24, is inclined to reduce the light that returns to the input optical fiber 22. The first end surface 26a is preferably inclined by eight degrees with respect to the surface that is perpendicular to a central axis 28. The second end surface 26b of the lens 26, which faces the optical device 25, is a flat surface and is perpendicular to the central axis 28 of the lens 26.

An end surface 24a of the capillary 24, which faces the lens 26, is inclined by the same angle as the first end surface 26a of the lens 26. The emission end of the input optical fiber 22 and the entrance end of the output optical fiber are exposed at the end surface 24a of the capillary 24. The distance between the end surface 24a of the capillary 24 and the first end surface 26a of the lens 26 is the same as the focal distance of the lens 26. Therefore, the length Z1 (along the central axis 28) of the lens 26 is slightly shorter than ¼ pitch.

A procedure for assembling the optical circuit module 21 will now be described. The assembling procedure includes the following processes (A), (B), and (C).

(A) The lens 26 is fixed inside the sleeve 27 such that the focal point of the lens 26 is aligned with the first end surface 27a of the sleeve 27 as shown in FIG. 3A.

(B) After the lens 26 is fixed, the capillary 24 is inserted into the sleeve 27. Then, the inclination of the optical device 25 with respect to the central axis 28 of the lens 26 and the position of the capillary 24 in the direction of the central axis 28 are adjusted to maximize the intensity of the optical signal emitted from the emission end of the output optical fiber 23.

(C) After the optical device 25 and the capillary 24 are adjusted, the optical device 25 is fixed to the first end surface 27a of the sleeve 27 and the capillary 24 is fixed in the sleeve 27.

In the process (A), the lens 26 is fixed inside the sleeve 27 such that the distance d1 between the second end surface 26b of the lens 26 and the first end surface 27a of the sleeve 27 is equivalent to the focal distance of the lens 26.

Figure 3B:
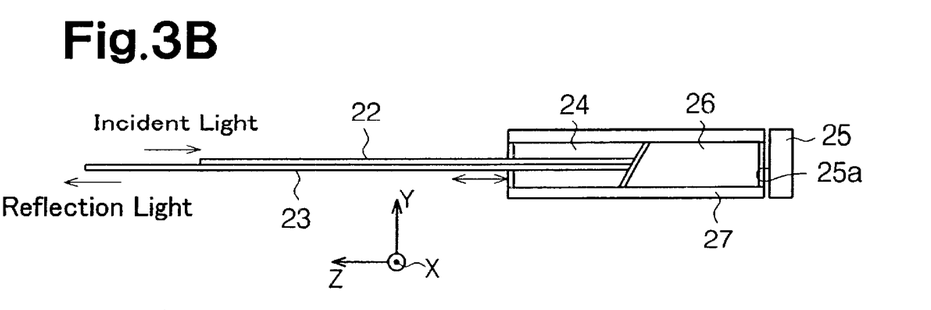

In the process (B), the optical signal emitted from the emission end of the output optical fiber 23 is received by a photodetector such as a photodiode (not shown). The output of the photodetector is monitored and the optical device 25 and the capillary 24 are adjusted to maximize the output. When adjusting the inclination of the optical device 25, the optical device 25 and the capillary 24 are retained by fixtures (not shown). Then, the inclination angle with respect to the X-axis and Y-axis is adjusted as shown in FIG. 3B.

In the process (C), the optical device 25 is fixed to the first end surface 27a of the sleeve 27. In this case, for example, an adhesive made of ultraviolet setting resin is applied to the joint in advance and exposed to light. The capillary 24 is fixed to the sleeve 27. In this case, for example, an adhesive made of ultraviolet setting resin is applied to the outer circumferential surface of the capillary 24 in advance and exposed to light.

The optical circuit module 21 according to the first embodiment provides the following advantages.

(1) The capillary 24, which retains the input optical fiber 22 and the output optical fiber 23, the lens 26, and the optical device 25 are fixed to one sleeve 27. Therefore, the number of parts used in the module is reduced and the size of the entire module is reduced.

(2) The capillary 24 and the lens 26 are positioned with respect to the reflection surface 25a of the optical device 25 in the same sleeve 27. Thus, the optical device 25 is fixed at the optimum position with respect to the capillary 24 and the lens 26. In this state, the converged light signal, which is reflected by the optical device 25 and converged by the lens 26, is supplied to the output optical fiber 23 in a suitable manner. Therefore, the coupling loss between the input optical fiber 22 and the output optical fiber 23 is reduced. As a result, the insertion loss of the module is reduced.

(3) The adhesive does not enter the optical path between the lens 26 and the photoactive member 25 and the optical path between the lens 26 and the capillary 24. Thus, there is no need to be careful about the adhesive entering the optical path while fixing the components. This facilitates the procedure for fixing the components with adhesive.

(4) The lens 26 is fixed in the sleeve 27 such that the distance d1 between the second end surface 26b of the lens 26 and the first end surface 27a of the sleeve 27 is equal to the focal distance of the lens 26. Therefore, when the reflection surface 25a of the optical device 25 abuts against the first end surface 27a of the sleeve 27, the reflection surface 25a is aligned with the focal point of the lens 26. Thus, the inclination of the optical device 25 with respect to the central axis 28 of the lens 26 is adjusted while the reflection surface 25a of the photoactive member 25 is substantially aligned with the focal point of the lens 26. As a result, the optical circuit module 21 is reliably and easily aligned.

(5) The end surface 24a of the capillary 24 is inclined. Therefore, the amount of light that returns to the input optical fiber 22 is reduced.

(6) If the optical circuit module 21 is applied to a dual fiber collimator (a collimator that has two optical fibers), the size of the dual fiber collimator is reduced. As a result, the cost and insertion loss of the dual fiber collimator are reduced and the parts are easily fixed by adhesive.

[Second Embodiment]

Figure 4A:
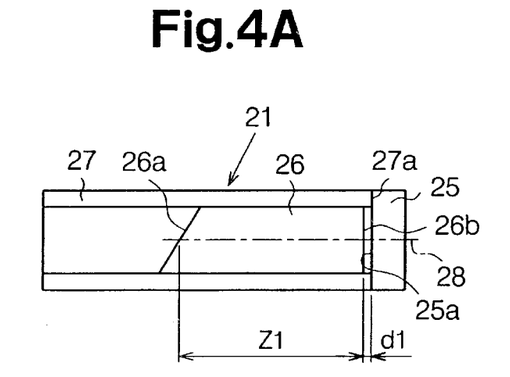
FIG. 4A is a schematic cross-sectional view of an optical circuit module according to a second embodiment of the present invention.

An optical circuit module 21 according to a second embodiment and a procedure for assembling the same will now be described with reference to FIGS. 4A, and 4B.

Figure 4B:
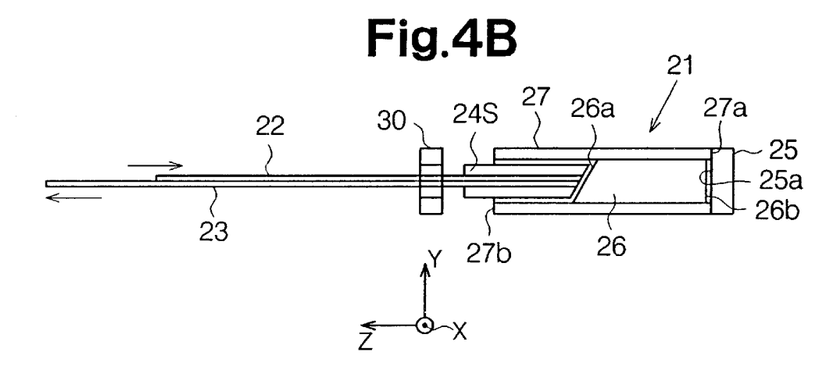
FIG. 4B is an explanatory diagram of assembling procedure for the module shown in FIG. 4A.

In the second embodiment, as shown in FIG. 4B, the outer diameter of a capillary 24S (a first capillary 24S) is smaller than the inner diameter of the sleeve 27 such that a space (alignment tolerance) is formed between the outer wall of the capillary 24S and the inner wall of the sleeve 27. Therefore, the position of the capillary 24S along the central axis 28 in the sleeve 27 and the inclination of the capillary 24S with respect to the central axis 28 are adjusted. After the position and the inclination of the capillary 24S are adjusted in the sleeve 27, the capillary 24S is fixed to a second end surface 27b of the sleeve 27 by a tube 30.

A procedure for assembling the optical circuit module 21 according to the second embodiment will now be described.

The assembling procedure includes the following processes (A), (B), and (C).

(A) The reflection surface 25a of the optical device 25 is held against the first end surface 27a of the sleeve 27 to be fixed. The lens 26 is fixed in the sleeve 27 such that the focal point of the lens 26 is aligned with the first end surface 27a of the sleeve 27 (see FIG. 4A).

(B) The position of the capillary 24S in the direction of the central axis 28 and the inclination of the capillary 24S with respect to the central axis 28 are adjusted to maximize the intensity of the optical signal emitted from the emission end of the output optical fiber 23.

(C) After adjusting the capillary 24S, the capillary 24S is fixed to the second end surface 27b of the sleeve 27 with the tube 30. The inner diameter of the tube 30 is substantially equal to the outer diameter of the capillary 24S.

In the process (C), for example, an adhesive made of ultraviolet setting resin is applied to the inner wall of the tube 30 and the end surface of the tube 30, which contacts the sleeve 27, in advance. When the adhesive is exposed to light, the tube 30 is fixed to the sleeve 27.

The optical circuit module 21 according to the second embodiment provides the following advantages in addition to the advantages provided in the first embodiment of the optical circuit module.

The optical device 25 and the lens 26 are secured to the sleeve 27 in advance.

[Third Embodiment]

Figure 5:
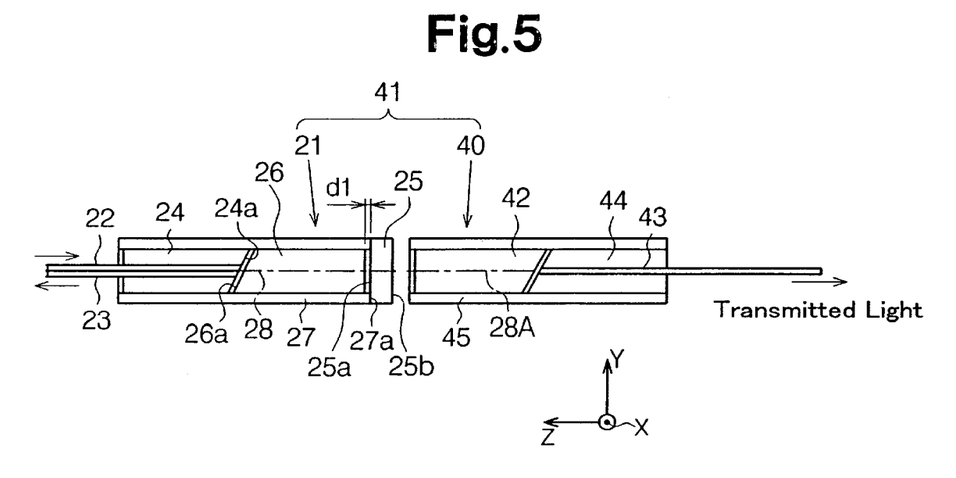
FIG. 5 is a schematic cross-sectional view of an optical circuit module according to a third embodiment of the present invention.

FIG. 5 is a schematic cross-sectional view of an optical circuit module 41 according to a third embodiment. The optical circuit module 41 of the third embodiment includes a collimator 40 that has a single optical fiber (hereinafter, referred to as a single fiber collimator) in addition to the optical circuit module 21 according to the first embodiment. The single fiber collimator 40 is fixed to the optical circuit module 21 to receive a transmitted light from the optical device 25.

The single fiber collimator 40 includes a second lens 42, a transmitted light optical fiber 43, a second capillary 44, and a second sleeve 45. The second lens 42 converges the incident light, which has been transmitted through the capillary 24 and the lens 26 of the optical circuit module 21 and has entered the optical device 25. The second capillary 44 retains the transmitted light optical fiber 43. The second sleeve 45 accommodates the second lens 42 and the second capillary 44.

Among an optical signal that enters the optical device 25 (for example, an optical signal that includes light components having the wavelength of $\lambda 1$ to $\lambda n$), the optical device 25, for example, reflects a light component having the wavelength of $\lambda 1$ and transmits the reminder of the light components.

A procedure for assembling the single fiber collimator 40 of the optical circuit module 41 will now be described.

The assembling procedure includes the following processes (A), (B), and (C).

(A) The second lens 42 is fixed in the second sleeve 45.
(B) After the second lens 42 is fixed, the position of the second capillary 44 along the central axis 28A and the inclination of the second capillary 44 with respect to the central axis 28 of the optical circuit module 21 are adjusted to maximize the intensity of the optical signal emitted from the emission end of the transmitted light optical fiber 43,
(C) After adjusting the position and the inclination of the second capillary 44, the second capillary 44 is fixed to the second sleeve 45. Also, one end surface of the second sleeve 45 is fixed to a transmitted light emission surface 25b of the optical device 25. In this state, the second sleeve 45 may be fixed to the optical circuit module 21 through a predetermined member (not shown).

The second sleeve 45 is fixed to the optical circuit module 21 by, for example, applying the adhesive made of ultraviolet setting resin to the joint of the sleeve 45 in advance and exposing the adhesive to light.

The optical circuit module 41 according to the third embodiment provides the following advantages in addition to the advantages provided in the first embodiment of the optical circuit module.

The optical circuit module 41, which has an additional function, is easily formed by only fixing the single fiber collimator 40 to the optical circuit module 21 of the first embodiment.

[Fourth Embodiment]

Figure 6:
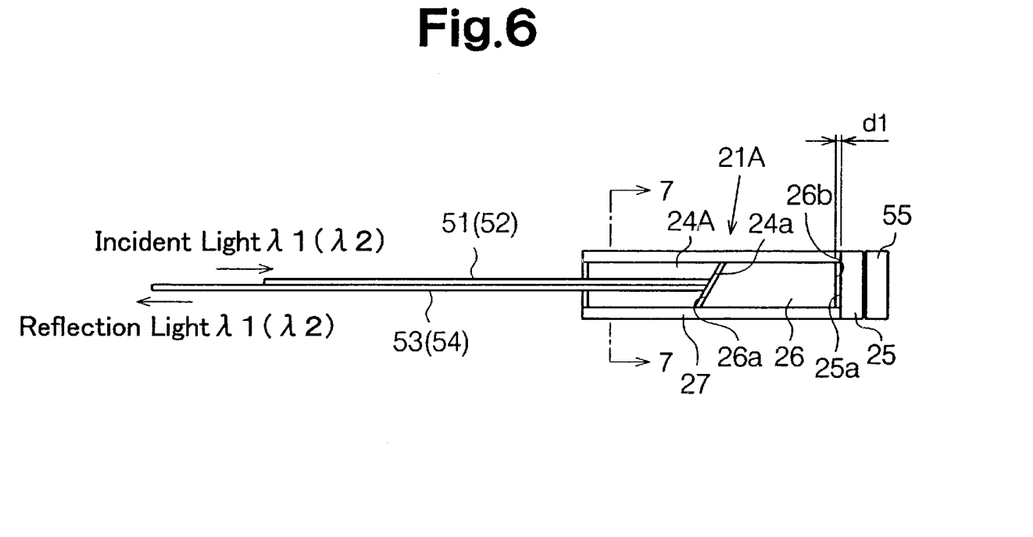
FIG. 6 is a schematic cross-sectional view of an optical circuit module according to a fourth embodiment of the present invention.

FIG. 6 is a schematic cross-sectional view of an optical circuit module 21A according to a fourth embodiment. The optical circuit module 21A according to the fourth embodiment includes a capillary 24A (a first capillary 24A), which retains 5 first and second input optical fibers 51, 52 and first and second output optical fibers 53, 54, in addition to the capillary 24 of the first embodiment shown in FIG. 1. Furthermore, a second optical device 55 is attached to the first optical device 25.

When a combined optical signal having several wavelengths $\lambda 1$ to $\lambda n$ enters the first optical device 25, the first optical device 25 reflects a particular wavelength. For example, the first optical device 25 reflects an optical signal having the wave length of $\lambda 1$. When the combined optical signal, which includes light components having the wavelength of $\lambda 2$ to $\lambda n$, is transmitted through the first optical device 25 and enters the second optical device 55, the second optical device 55 reflects a particular wavelength. For example, the second optical device 55 reflects an optical signal having the wave length of $\lambda 2$. Therefore, by using two kinds of optical devices 25, 55, the optical signals having the particular wavelengths such as $\lambda 1, \lambda 2$ are separated from the combined optical signal. Then, each separated optical signal having the wavelength $\lambda 1$ or $\lambda 2$ is obtained individually.

Figure 7:
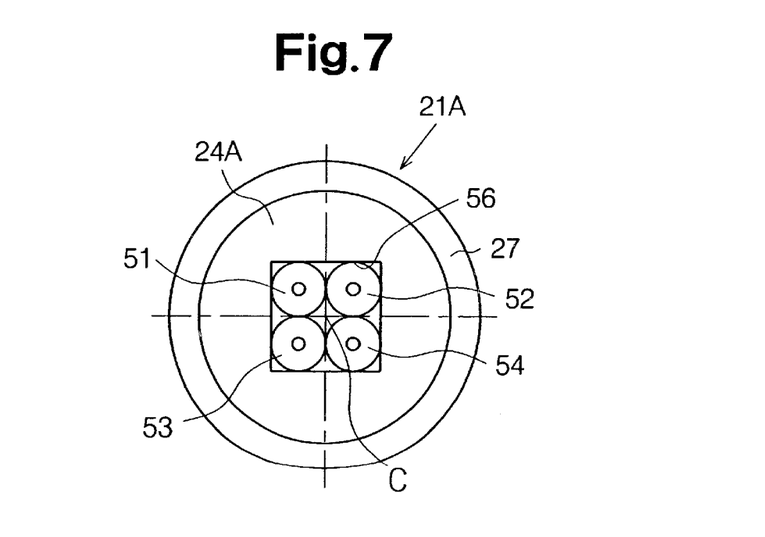
FIG. 7 is a cross-sectional view taken along line 7—7 of FIG. 6.

The first input optical fiber 51 and the first output optical fiber 53 are for a first optical signal (optical signal having the wavelength of $\lambda 1$) and the second input optical fiber 52 and the second output optical fiber 54 are for a second optical signal (optical signal having the wavelength of $\lambda 2$). As shown in FIG. 7, a square fiber-retaining hole 56 is formed at the center of the capillary 24A. The first and second input optical fibers 51, 52 and the first and second output optical fibers 53, 54 are retained in the fiber-retaining hole 56 to be symmetrical with each other with respect to the center bore C.

In the optical circuit module 21A, the combined optical signal travels along the first and second input optical fibers 51, 52 and the lens 26 and then enters the optical device 25. The optical signal having the wavelength of $\lambda 1$ in the combined optical signal is reflected by the first optical device 25. The reflected optical signal travels through the lens 26 and is supplied to the first output optical fiber 53. The combined optical signal, which includes the light components having the wavelength of $\lambda 2$ to $\lambda n$, is transmitted through the first optical device 25. The optical signal having the wavelength of $\lambda 2$ is reflected by the second optical device 55. Thus, the optical signal having the wavelength of $\lambda 2$ is transmitted through the first optical device 25 again and travels through the lens 26 and is supplied to the output optical fiber 54.

The optical circuit module 21A according to the fourth embodiment provides the following advantages in addition to the advantages provided in the first embodiment of the optical circuit module.

When the optical circuit module 21A is applied to a quad fiber collimator, which includes the first and second input optical fibers 51, 52 and the first and second output optical fibers 53, 54, the quad fiber collimator is miniaturized. As a result, the cost and the insertion loss of the quad fiber collimator are reduced and the parts are easily fixed by adhesive.

In the fourth embodiment, before fixing the second optical device 55 to the first optical device 25, the position and the inclination of the capillary 24A and the inclination of the second optical device 55 are adjusted such that the optical signal having the wavelength of $\lambda 1$ is supplied to the optical fiber 53 and the optical signal having the wavelength of $\lambda 2$ is supplied to the optical fiber 54.

[Fifth Embodiment]

Figure 8:
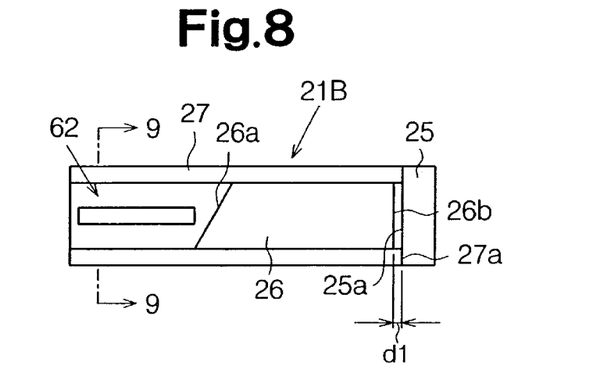
FIG. 8 is a schematic cross-sectional view of an optical circuit module according to a fifth embodiment of the present invention.

FIG. 8 is a schematic cross-sectional view of an optical circuit module 21B according to a fifth embodiment.

Figure 9:
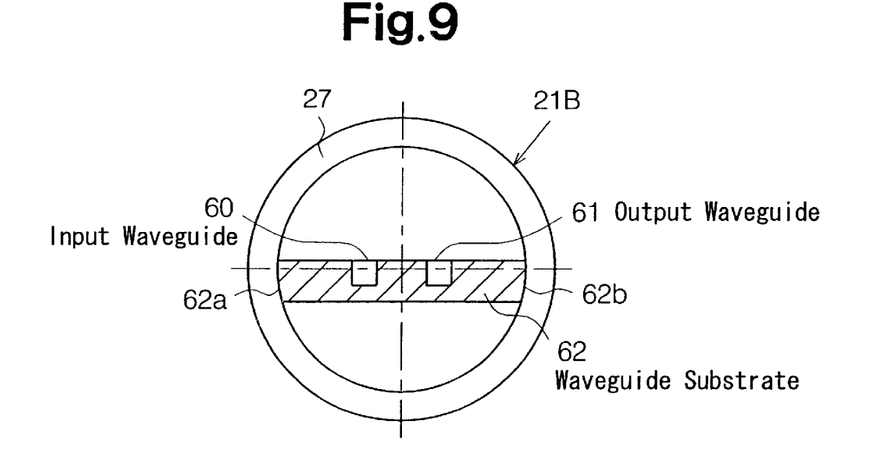
FIG. 9 is a cross-sectional view taken along line 9—9 of FIG. 8.

As shown in FIG. 9, the optical circuit module 21B according to the fifth embodiment includes an input waveguide 60, an output waveguide 61, and a waveguide substrate 62, on which the waveguides 60, 61 are formed, instead of the capillary 24 of the first embodiment shown in FIG. 1.

The waveguide substrate 62 is fixed in the sleeve 27 such that a converged light signal reflected by the optical device 25 and converged by the lens 26 is supplied to the output waveguide 61 in a suitable manner. That is, in the optical circuit module 21B of the fifth embodiment, an optical signal that travels through the input waveguide 60 and enters the lens 26 is converted to a parallel light with the lens 26. The parallel light is then reflected by the optical device 25. The reflected parallel light is converged with the lens 26. The converged converged light signal enters the output waveguide 61 and travels along the waveguide 61. The reflected parallel light is then emitted to the other optical element (not shown).

The waveguide substrate 62 is a tabular member, the surface of which is provided with the waveguides 60, 61. The waveguide substrate 62 includes curved side surfaces 62a, 62b, which fit the inner circumferential surface of the sleeve 27.

The optical circuit module 21B of the fifth embodiment provides the following advantages in addition to the advantages provided in the first embodiment of the optical circuit module.

The side surfaces 62a, 62b of the waveguide substrate 62 are formed into curved surfaces to be fitted to the inner circumferential surface of the sleeve 27. Therefore, the waveguide substrate 62 is reliably fixed in the sleeve 27 by inserting the waveguide substrate 62 into the sleeve 27 and fixing the side surfaces 62a, 62b with adhesive.

Figure 10:
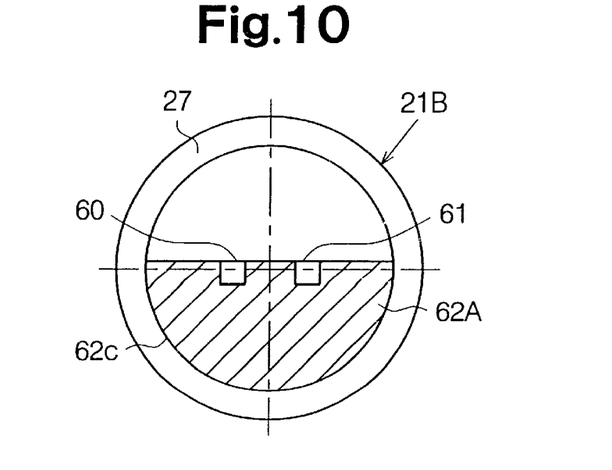
FIG. 10 is a cross-sectional view of a modification of the fifth embodiment.

In the fifth embodiment, a semi-cylindrical waveguide substrate 62A, which has a semi-spherical surface that fits the inner circumferential surface of the sleeve 27, may be used instead of the tabular waveguide substrate 62 as shown in FIG. 10.

[Sixth Embodiment]

Figure 11:
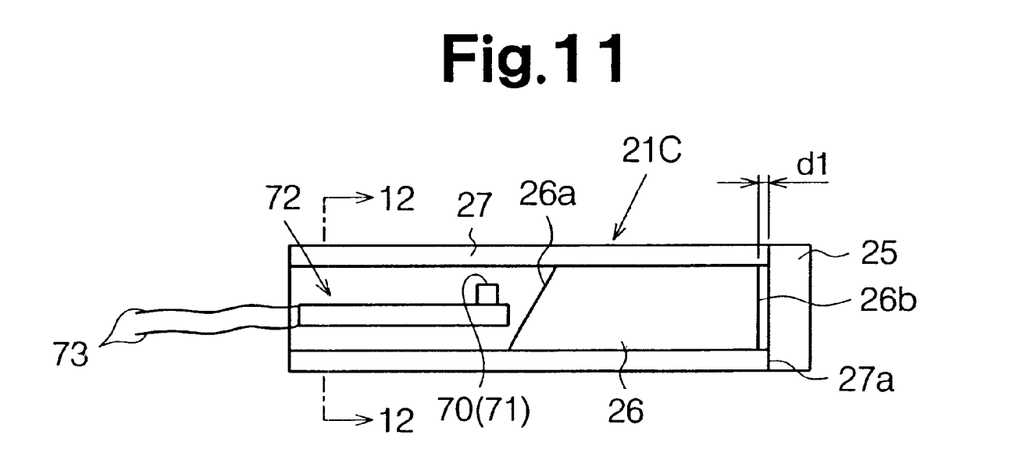
FIG. 11 is a schematic cross-sectional view of an optical circuit module according to a sixth embodiment of the present invention.
Figure 12:
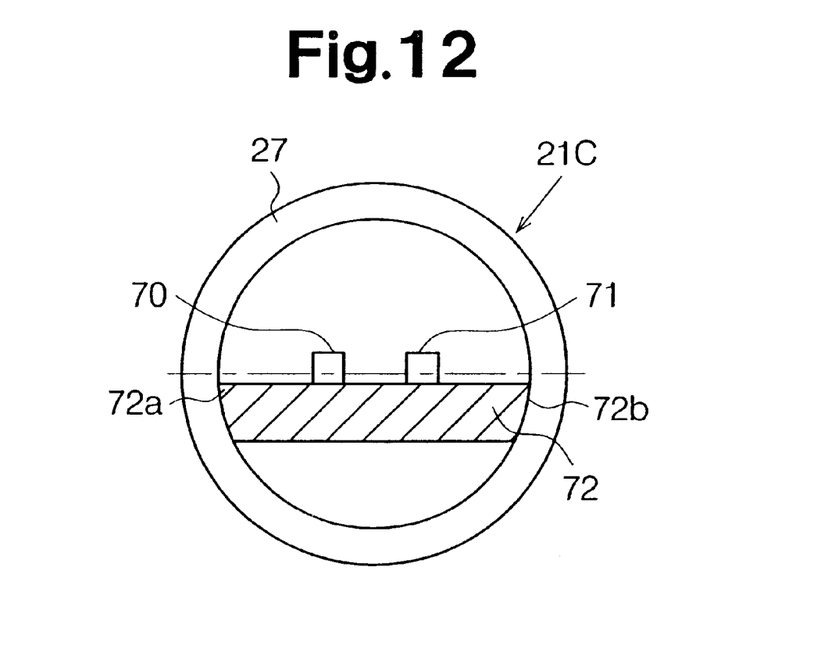
FIG. 12 is a cross-sectional view taken along line 12—12 of FIG. 11.

FIG. 11 is a schematic cross-sectional view of an optical circuit module 21C according to a sixth embodiment. The optical circuit module 21C according to the sixth embodiment includes a light emitting device 70, a photodetector 71, and a retaining member 72 instead of the capillary 24 of the first embodiment shown in FIG. 1. The light emitting device 70 and the photodetector 71 are formed into chip-shaped members. The light emitting device 70 is, for example, a light emitting diode and the photodetector 71 is, for example, a photodiode.

The retaining member 72 is a tabular member on which the light emitting device 70 and the photodetector 71 are packaged. The side surfaces 72a, 72b of the retaining member 72 are curved to be fitted to the inner circumferential surface of the sleeve 27.

The retaining member 72 is fixed in the sleeve 27 such that an optical signal, which is reflected by the optical device 25 and converged by the lens 26, is received by the photodetector 71 in a suitable manner. Therefore, in the optical circuit module 21C of the sixth embodiment, an incident light is emitted from the light emitting device 70. The incident light then enters the lens 26 and is converted to a parallel light by the lens 26. The parallel light is reflected by the optical device 25 and converged by the lens 26. The converged light signal enters the photodetector 71. The photodetector 71 generates an electrical signal in accordance with the intensity of the received converged light signal and then outputs the electrical signal via a wire 73.

The optical circuit module 21C of the sixth embodiment provides the following advantages.

The side surfaces 72a, 72b of the retaining member 72 are curved to fit with the inner circumferential surface of the sleeve 27. Therefore, the retaining member 72 is reliably fixed in the sleeve 27 by inserting the retaining member 27 into the sleeve 27 and fixing the side surfaces 72a, 72b with adhesive.

It should be apparent to those skilled in the art that the present invention may be embodied in many other specific forms without departing from the spirit or scope of the invention. Particularly, it should be understood that the invention may be embodied in the following forms.

In the first embodiment, the capillary 24 and the sleeve 27 are preferably manufactured accurately such that when the capillary 24 is inserted in the sleeve 27, the center C of the capillary 24 is aligned with the central axis 28 and the central axes C1, C2 of the cores of the optical fibers 22, 23 are parallel to the central axis 28 In this case, the inclination of the capillary 24 need not be adjusted in the process (B) of the first embodiment and only the position of the capillary 24 along the central axis 28 needs to be adjusted. This facilitates alignment of the optical circuit module 21.

In the second embodiment, for example, resin may be applied between the outer circumferential surface of the capillary 24A and the inner circumferential surface of the sleeve 27 instead of the tube 30.

The optical circuit modules according to the first, second, fourth, fifth, and sixth embodiments, may be provided with the single fiber collimator 40 according to the third embodiment.

In the fourth embodiment shown in FIG. 6, the first and second input optical fibers 51, 52 may be changed to a single input optical fiber.

In the fourth embodiment, a multi-fiber capillary, which includes five optical fibers or more, may be used instead of the capillary 24A.

In the fifth embodiment shown in FIG. 8, a capillary, which has at least one input optical fiber, and the waveguide substrate 62, which has at least one output waveguide 61, may be provided in the sleeve 27. In this case, the waveguide substrate is embedded in the capillary.

In the fifth embodiment, the waveguide substrate 62, which has at least one input waveguide 60, and a capillary, which has at least one output optical fiber, may be provided in the sleeve 27.

In the sixth embodiment shown in FIG. 11, a capillary, which has at least one input optical fiber, and the retaining member 72, which has at least one photodetector 71, may be provided in the sleeve 27.

In the sixth embodiment, the retaining member 72, which has at least one light emitting device 70, and a capillary, which has at least one output optical fiber that serves as optical signal receiving means, may be provided in the sleeve 27.

In the sixth embodiment, a diode chip that includes a number of light emitting diodes, each of which emits one of optical signals $\lambda 1$ to $\lambda n$, and a diode array chip that includes a number of photo diode arrays, each of which receives the corresponding one of the optical signals $\lambda 1$ to $\lambda n$. In this case, the photo diode arrays generate and output n types of electrical signals after detecting the intensity of the optical signals $\lambda 1$ to $\lambda n$.

Therefore, the present examples and embodiments are to be considered as illustrative and not restrictive and the invention is not to be limited to the details given herein, but may be modified within the scope and equivalence of the appended claims.

What is claimed is:

1. An optical circuit module comprising:
   optical signal emitting means for emitting an optical signal;
   a first sleeve, which includes a first end surface;
   an optical device, which includes a reflection surface, wherein the reflection surface abuts against the first end surface of the sleeve;
   a first lens located between the optical signal emitting means and the optical device, wherein the first lens converts the optical signal emitted from the optical signal emitting means into a collimated optical signal and emits the collimated optical signal to the optical device, wherein the optical device reflects the collimated optical signal with the reflection surface, and the first lens converges the reflected collimated optical signal and generates a converged light signal; and optical signal receiving means for receiving the converged light signal, wherein the first lens is fixed in the first sleeve such that the focal point of the lens aligns with the reflection surface of the optical device, and wherein the optical signal emitting means and the optical signal receiving means are fixed in the first sleeve such that the converged light signal is coupled into the optical signal receiving means.

2. The optical circuit module according to claim 1, wherein the optical signal emitting means includes at least one input optical fiber, and the optical signal receiving means includes at least one output optical fiber, wherein the optical circuit module further comprises a first capillary for retaining the input and output optical fibers, and wherein the first capillary is fixed in the first sleeve such that the converged light signal is coupled into the output optical fiber.

3. The optical circuit module according to claim 2, wherein the outer diameter of the first capillary is smaller than the inner diameter of the first sleeve.

4. The optical circuit module according to claim 3, wherein a space is formed between the first capillary and the first sleeve to adjust the position and the inclination angle of the first capillary.

5. The optical circuit module according to claim 3 further comprises a tube for fixing the first capillary to the first sleeve.

6. The optical circuit module according to claim 2, wherein the first capillary retains at least one input optical fiber and two output optical fibers.

7. The optical circuit module according to claim 6, wherein the optical device includes:
   a first optical device for reflecting a light that has a particular wavelength; and
   a second optical device located next to the first optical device, wherein the second optical device reflects a transmitted light from the first optical device.

8. The optical circuit module according to claim 2 further comprises a collimator, which is fixed to the optical device, wherein the collimator includes:
   a second lens, wherein the second lens receives the optical signal transmitted through the optical device and converges the received optical signal;
   at least one transmitted light optical fiber for receiving the optical signal converged by the second lens;
   a second capillary for retaining the transmitted light optical fiber; and
   a second sleeve, which is fixed to the optical device, wherein the second sleeve accommodates the second lens and the second capillary.

9. The optical circuit module according to claim 1, wherein the optical signal emitting means includes at least one input waveguide, and the optical signal receiving means includes at least one output waveguide, wherein the optical circuit module further comprises a waveguide substrate, which includes the input and output waveguide, and the waveguide substrate is fixed in the sleeve such that the converged light signal is coupled into the output waveguide.

10. The optical circuit module according to claim 9, wherein the waveguide substrate has a curved side surface that fits the inner surface of the first sleeve.

11. The optical circuit module according to claim 1, wherein the optical signal emitting means includes at least one input optical fiber, and the optical signal receiving means includes at least one photodetector, wherein the optical circuit module further comprises a capillary for retaining the optical fiber and a retaining member for retaining the photodetector, and wherein the capillary and the retaining member are fixed in the sleeve such that the converged light signal is coupled into the photodetector.

12. The optical circuit module according to claim 1, wherein the optical signal emitting means includes at least one light emitting device, and the optical signal receiving means includes at least one output optical fiber, wherein the optical circuit module further comprises a retaining member for retaining the light emitting device and a capillary for retaining the optical fiber, and wherein the retaining member and the capillary are fixed in the sleeve such that the converged light signal is coupled into the output optical fiber.

13. The optical circuit module according to claim 2, wherein the optical signal emitting means includes at least one light emitting device, and the optical signal receiving means includes at least one photodetector, wherein the optical circuit module further comprises a retaining member for retaining the light emitting device and the photodetector, wherein the retaining member is fixed in the sleeve such that the converged light signal is coupled into the photodetector.

14. A method for assembling an optical circuit module, wherein the optical circuit module includes optical signal emitting means, a sleeve, an optical device, a lens, and optical signal receiving means, wherein the optical signal emitting means emits an optical signal, wherein the sleeve has a first end surface, wherein the optical device has a reflection surface, and the reflection surface abuts against the first end surface of the sleeve, wherein the lens is located between the optical signal emitting means and the optical device, and the lens converts an optical signal, which is emitted from the optical signal emitting means, into a collimated optical signal, and emits the collimated optical signal to the optical device, wherein the optical device reflects the collimated optical signal with the reflection surface, and the lens converges the reflected collimated optical signal and generates a converged light signal, and wherein the optical signal receiving means receives the converged light signal, wherein the assembling method comprising:
   fixing the lens in the sleeve such that the focal point of the lens aligns with the first end surface of the sleeve;
   adjusting the inclination angle of the optical device with respect to the central axis of the lens such that the intensity of the converged light signal received by the optical signal receiving means is maximized;
   adjusting the position of the optical signal emitting means and the optical signal receiving means along the central axis of the lens; and
   fixing the optical device to the first end surface of the sleeve and fixing the optical signal emitting means and the optical signal receiving means in the sleeve.

15. A method for assembling an optical circuit module, wherein the optical circuit module includes optical signal emitting means, a sleeve, an optical device, a lens, and optical signal receiving means, wherein the optical signal emitting means emits an optical signal, wherein the sleeve has a first end surface, wherein the optical device has a reflection surface, and the reflection surface abuts against the first end surface of the sleeve, wherein the lens is located between the optical signal emitting means and the optical device, and the lens converts an optical signal, which is emitted from the optical signal emitting means, into a collimated optical signal, and emits the collimated optical signal to the optical device, wherein the optical device reflects the collimated optical signal with the reflection surface, and the lens converges the reflected collimated optical signal and generates a converged light signal, and wherein the optical signal receiving means receives the converged light signal, wherein the assembling method comprising:

fixing the optical device to the sleeve such that the reflection surface abuts against the first end surface of the sleeve;

fixing the lens in the sleeve such that the focal point of the lens aligns with the first end surface of the sleeve;

adjusting the position of the optical signal emitting means and the optical signal receiving means along the central axis of the lens and the inclination angle of the optical signal emitting means and the optical signal receiving means with respect to the central axis of the lens such that the intensity of the converged light signal received by the optical signal receiving means is maximized; and fixing the optical signal emitting means and the optical signal receiving means to the sleeve.

* * * * *